(12) United States Patent
Lin

(10) Patent No.: US 11,461,055 B2
(45) Date of Patent: Oct. 4, 2022

(54) HIERARCHICAL AND HETEROGENEOUS DATA CENTER

(71) Applicant: Silicon Motion, Inc., Jhubei (TW)

(72) Inventor: Ting-Kuan Lin, Changhua County (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 17/101,561

(22) Filed: Nov. 23, 2020

(65) Prior Publication Data

US 2021/0181996 A1     Jun. 17, 2021

(30) Foreign Application Priority Data

Dec. 11, 2019   (TW) .................................. 108145253

(51) Int. Cl.
   *G06F 3/06*     (2006.01)
(52) U.S. Cl.
   CPC .......... *G06F 3/0685* (2013.01); *G06F 3/0604* (2013.01); *G06F 3/067* (2013.01); *G06F 3/0653* (2013.01); *G06F 3/0659* (2013.01)

(58) Field of Classification Search
   CPC .......... G06F 3/06–0689; G06F 3/0685; G06F 3/0604; G06F 3/0653; G06F 3/0659; G06F 3/067
   See application file for complete search history.

(56) References Cited

U.S. PATENT DOCUMENTS

| 2018/0211708 A1* | 1/2018 | Igahara et al. ........ G06F 3/0659 |
| 2018/0260331 A1 | 9/2018 | Kotte et al. |
| 2019/0102083 A1* | 4/2019 | Dusija et al. ......... G06F 3/0679 |
| 2020/0133543 A1* | 4/2020 | Singh et al. ............ G06F 12/08 |

FOREIGN PATENT DOCUMENTS

| CN | 205620984 U | 10/2016 |
| EP | 2 982 086 B1 | 5/2019 |

\* cited by examiner

*Primary Examiner* — Nicholas J Simonetti
(74) *Attorney, Agent, or Firm* — McClure, Qualey & Rodack, LLP

(57) ABSTRACT

A low-cost, high-performance data center is shown, which is in a hierarchical and heterogeneous architecture. The data center includes at least three groups of servers, providing three kinds of storage media to store three types of data. The three groups of servers are connected to each other via a computer network. For data with medium access frequency, the corresponding group of servers use multi-level cell solid-state drives as the storage media, and these particular multi-level cell solid-state drives operate in a full-disk pseudo-single-level-cell mode.

11 Claims, 4 Drawing Sheets

HIERARCHICAL AND HETEROGENEOUS DATA CENTER

CROSS REFERENCE TO RELATED APPLICATIONS

This Applications claims priority of Taiwan Patent Applications No. 108145253, filed on Dec. 11, 2019, the entirety of which is incorporated by reference herein.

BACKGROUND OF THE INVENTION

Field of the Invention

The present invention is related to a hierarchical and heterogeneous data center.

Description of the Related Art

With the popularity of Internet of things and advanced cloud computing, the demand for data centers has increased significantly. In response to the explosive increase in cloud data, a data center may use a hierarchical and heterogeneous architecture.

A data center needs to process a lot of data, but only part of that data needs continuous real-time processing, and not all data need to be stored permanently. According to the access frequency and the importance of the data, data can be classified into three kinds: frequently accessed hot data; cold data that is rarely accessed; and warm data whose access frequency is between the hot data and the cold data. A hierarchical and heterogeneous architecture was developed to classify data and store the different kinds of data in the different types of storage media.

However, in a hierarchical and heterogeneous architecture, the suitable storage device for a specific hierarchical level may be quite expensive, resulting in excessively high construction costs for a data center. How to build a data center at a low cost is an important task in this technical field.

BRIEF SUMMARY OF THE INVENTION

A new hierarchical and heterogeneous data center is proposed, which uses a particular type of solid-state drive that can be operated in a full-disk pseudo-single-level-cell mode to implement one hierarchical level.

A hierarchical and heterogeneous data center in accordance with an exemplary embodiment of the present invention has: a first group of servers, configured to provide a first type of storage media for storage of a first kind of data; a second group of servers, configured to provide a second type of storage media for storage of a second kind of data; and a third group of servers, configured to provide a third type of storage media for storage of a third kind of data. The first group of servers, the second group of servers, and the third group of servers are connected to each other via a computer network. The access frequency of the first kind of data is greater than the access frequency of the second kind of data. The access frequency of the second kind of data is greater than the access frequency of the third kind of data. The second type of storage media is a solid-state drive, and particularly one that may be operated in a full-disk pseudo-single-level-cell mode.

In an exemplary embodiment, when it is recognized as the second kind of data, data that the user uploads to the hierarchical and heterogeneous data center is stored in the second type of storage media by the second group of servers in a pseudo-single-level-cell manner.

In an exemplary embodiment, data that the first group of servers reads from the first type of storage media and transfers to the second group of servers via the computer network is stored in the second type of storage media in the pseudo-single-level-cell manner.

In an exemplary embodiment, data that the third group of servers reads from the third type of storage media and transfers to the second group of servers via the computer network is stored in the second type of storage media in the pseudo-single-level-cell manner.

In the second type of storage media, data collected by garbage collection may be programmed in the pseudo-single-level-cell manner.

In an exemplary embodiment, the third type of storage media is a solid-state drive of the same type as the solid-state drive implementing the second type of storage media. The solid-state drive implementing the third type of storage media can be operated in a multi-level cell mode.

In the third type of storage media, data may be first programmed in a pseudo-single-level-cell manner and then, by garbage collection, collected in a multi-level cell mode.

In an exemplary embodiment, the first type of storage media provides volatile storage.

In an exemplary embodiment, the first type of storage media is double data rate synchronous dynamic random access memory.

In an exemplary embodiment, the access rate of the first type of storage media is greater than the access rate of the second type of storage media, and the access rate of the second type of storage media is greater than the access rate of the third storage media.

In an exemplary embodiment, a storage capacity of the first type of storage media is smaller than a storage capacity of the second storage media, and a storage capacity of the second type of storage media is smaller than a storage capacity of the third storage media.

In an exemplary embodiment, the second group of servers uses the second type of storage media for browsing cloud logbooks.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A flash memory is a common non-volatile memory that provides long-term data storage. Nowadays, data storage devices often use flash memory as the storage media for products such as solid-state drive (SSD). A data center may be established by solid-state drive.

To deal with the explosive increase in the cloud data, a data center is established in a hierarchical and heterogeneous architecture. In the data center, data is classified according to its access frequency or/and importance, and the different kinds of data are separately stored in the different types of storage media. In an exemplary embodiment of the present invention, high-speed SSD implements one type of storage media in a hierarchical and heterogeneous data center.

There are various flash memory models, which are classified according to the storage capacity of each storage cell. In an SLC (single level cell) flash memory, each storage cell stores one bit of data. In an MLC (bi-level cell) flash memory, each storage cell stores two bits of data. In a TLC (triple level cell) flash memory, each storage cell stores three bits of data. In a QLC (quad level cell) flash memory, each storage cell stores four bits of data.

Figure 1A:
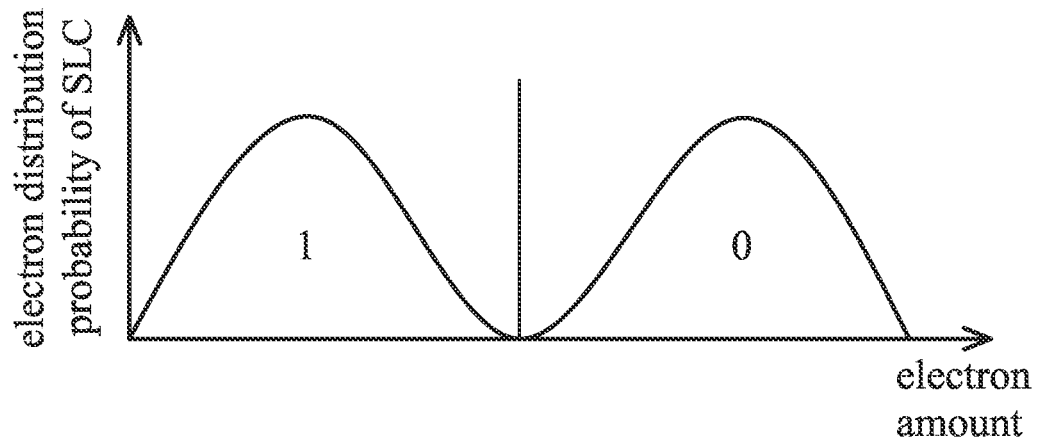
FIGS. 1A, 1B, and 1C correspond to SLC, MLC, and TLC designs, respectively. Each figure illustrates the distribution probability of gate floating electrons corresponding to the different digital values represented by one storage cell.
Figure 1B:
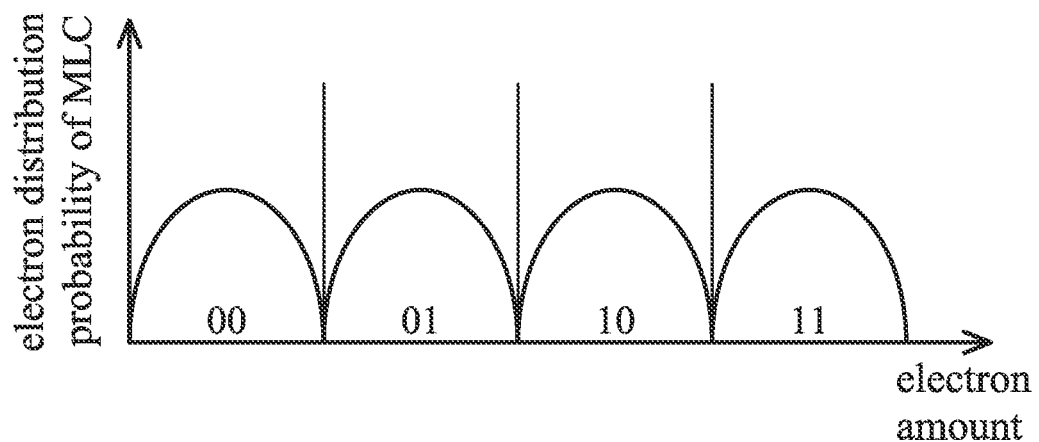
Figure 1C:
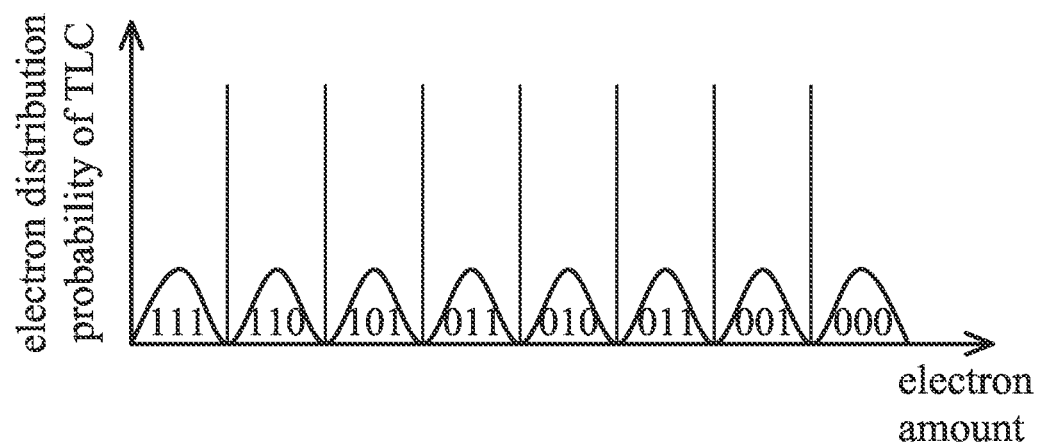

FIGS. 1A, 1B, and 1C correspond to SLC, MLC, and TLC designs, respectively. Each figure illustrates the distribution probability of gate floating electrons corresponding to the different digital values represented by one storage cell. The distribution probability of a QTL design is similar to those shown in FIGS. 1A, 1B, and 1C, which involves 16 digital representations.

As shown, the digital value represented by one storage cell depends on the number of gate floating electrons of the storage cell. The logical boundary of an SLC is clearer than that of a multi-level cell (e.g., MLC, TLC, or QLC). An SLC is more reliable and can be programmed at a higher speed. A multi-level cell (e.g., MLC, TLC, or QLC) have their advantages in storage capacity.

However, due to cost considerations, a multi-level cell (e.g., MLC, TLC, or QLC) flash memory is currently the mainstream on the market. An SLC flash memory is quite expensive.

For high accuracy and high speed operations, a multi-level cell (e.g., MLC, TLC, or QLC) flash memory is operated in a (full-disk) pseudo-single-level-cell mode in the present invention. Not as expensive as an SLC flash memory, a multi-level cell flash memory operated in a full-disk pseudo-SLC mode also has high accuracy and high access rate.

Figure 2:
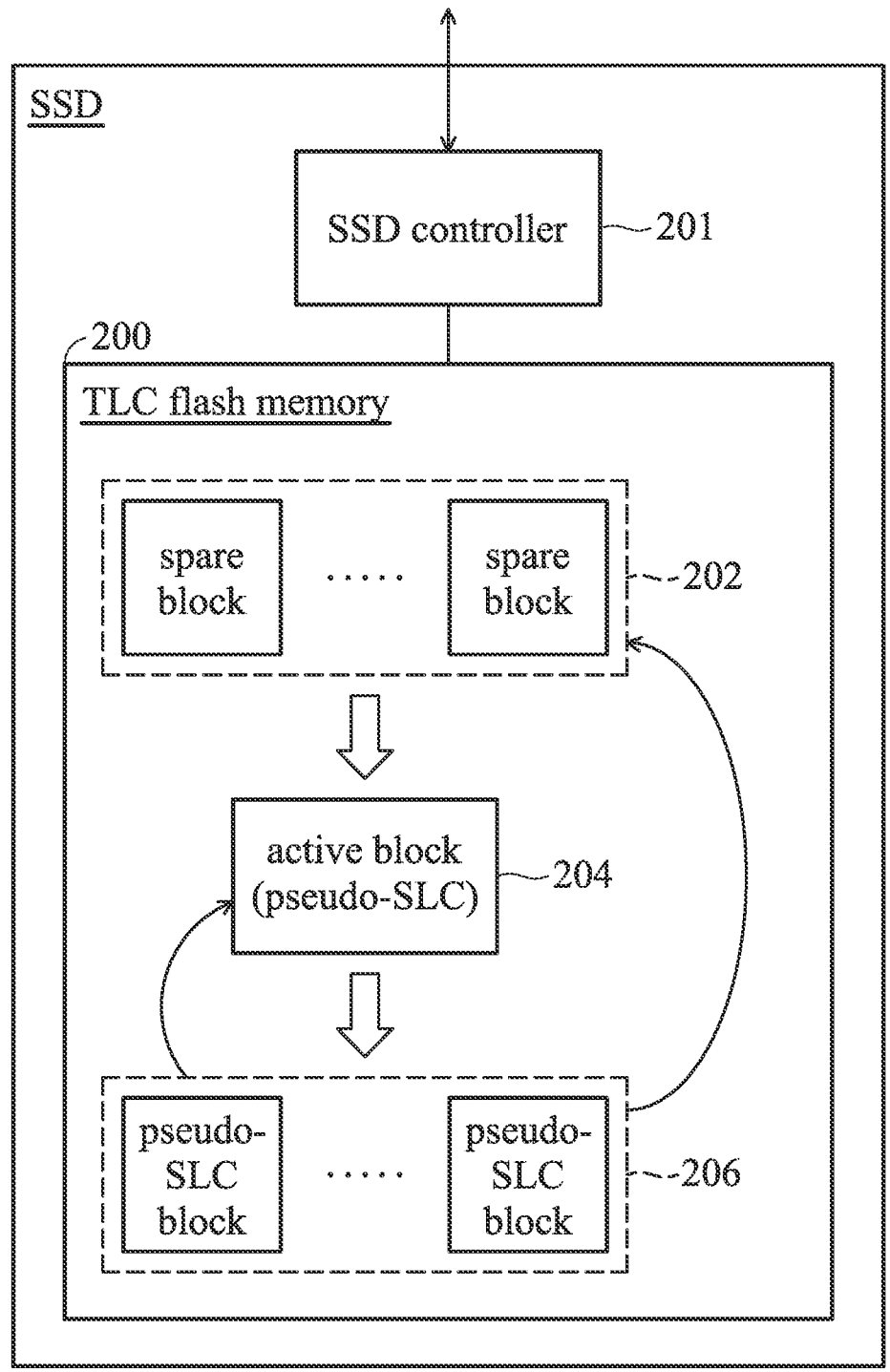
FIG. 2 uses a TLC flash memory 200 as an example to illustrate the full-disk pseudo-SLC mode.

FIG. 2 uses a TLC flash memory 200 as an example to illustrate the full-disk pseudo-SLC mode. An SSD of the present invention has an SSD controller 201 and a TLC flash memory 200. The TLC flash memory 200 includes spare blocks 202, and the spare blocks 202 contain TLCs. An active block 204 is selected from the spare blocks 202. When programming data into or reading data from the active block 204, the SSD controller 201 operates the storage cells of the active block 204 as SLCs rather than TLCs. When finishing the programming of the active block 204, the active block 204 is regarded as one of the pseudo-SLC blocks 206. The SSD controller 201 reads the pseudo-SLC blocks 206 by the reading manner for SLCs. By garbage collection, the one pseudo-SLC block of 206 can be released as the spare blocks 202. The spare blocks 202 each includes a plurality of pages. Each page includes a plurality of sectors. Each sector can store one unit of data, where the unit size, for example, is 512 B.

Data issued by an external device (e.g., a host) is stored in the active block 204 selected from the spare blocks 202 by SLC programming (one storage cell store one bit of data), so that the data programming on the active block 204 is reliable and fast even though the flash memory 200 is a TLC flash memory. When the active block 204 is closed or the data programming on the active block 204 is finished, the active block 204 is regarded as a pseudo-SLC block (206). To update data, the SSD controller 201 programs the new version of data in a blank section or a blank page, and invalidates the old data. In some situations, the pseudo-SLC block 206 may only retain a few valid data. Since the storage space of flash memory needs to be erased before being programmed again, garbage collection is required when the number of the spare blocks 202 gradually consumed is too small (for example, below the threshold). The SSD controller 201 performs garbage collection to move the scattered valid data from the pseudo-SLC blocks 206 to the active block 204. The collected valid data is stored in the active block 204 in the pseudo-SLC manner. After the valid data movement, the pseudo-SLC block with only invalid data remained is released to the pool of spare blocks 202 (wherein the block erasing can be done before or after pushing the newly-released block to the spare block pool). Accordingly, the number of spare blocks 202 is increased.

In particular, for a better data accessing performance, the SSDs of the present invention is in an over-provisioning design, which provides additional storage capacity. For example, the data storage capacity of each SSD of the present invention may be 400 GB (112 GB more than the provisioning design). In this way, the garbage collection process can be reduced, and more blocks can be released from the pseudo-SLC blocks 206 every time the garbage collection process is performed. In this manner, the erase counts of the spare blocks 202 are controlled within a reasonable amount, the service life of the SSD is prolonged. In some applications (for example, browsing a logbook), the data that the server handles is only for temporary use, so that garbage collection is not required. Such blocks can be directly erased and reused without garbage collection.

Figure 3:
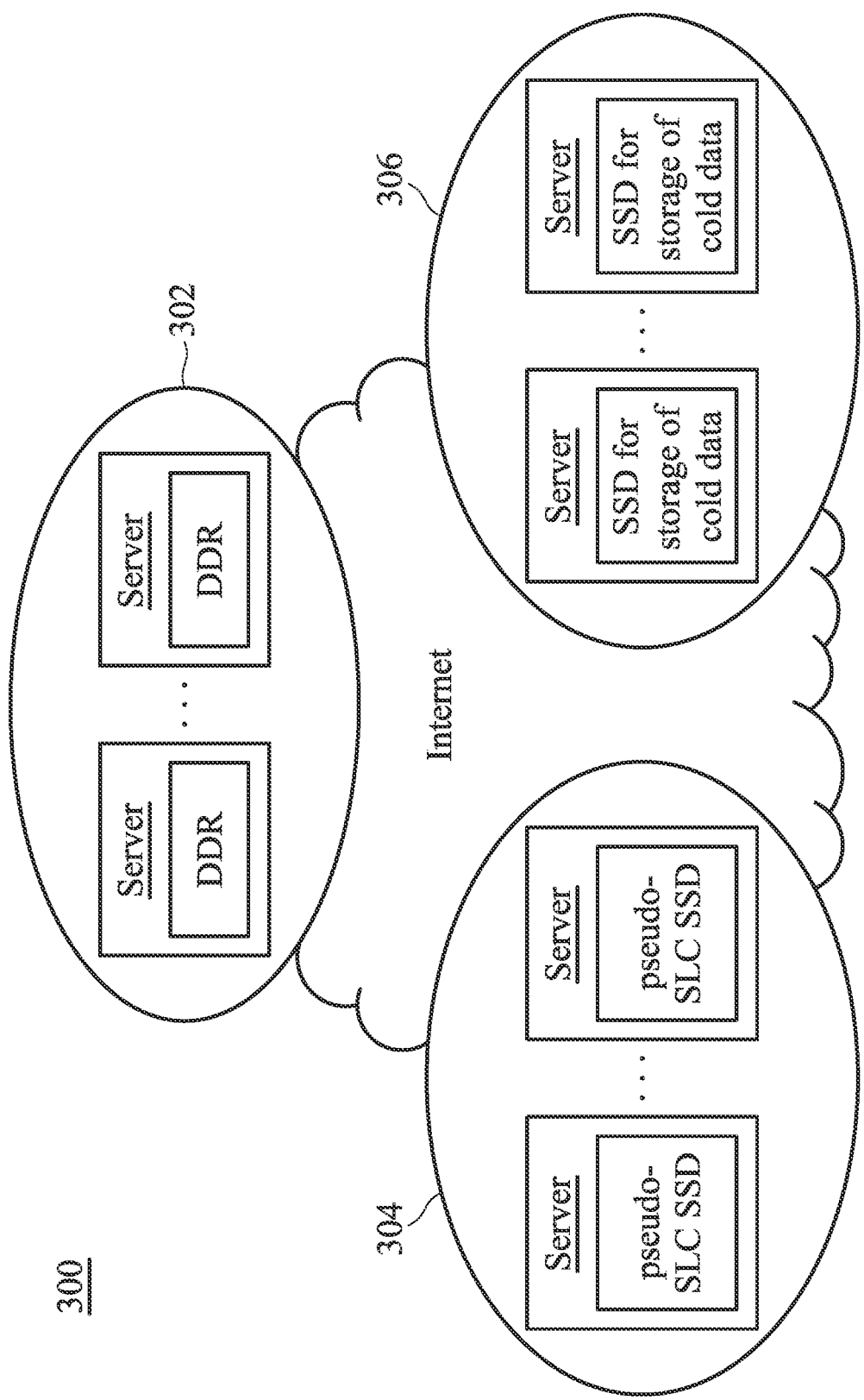
FIG. 3 illustrates a hierarchical and heterogeneous data center 300, in which the data can be classified into at least three kinds according to the access frequency or/and the importance.

FIG. 3 illustrates a hierarchical and heterogeneous data center 300, in which the data can be classified into at least three kinds according to the access frequency or/and the importance. The three kinds of data are: hot data which is accessed frequently; cold data which is rarely accessed; and warm data which is accessed not as usual as the hot data but more frequently than cold data. The access frequency judged in units of hours, minutes, or days. For example, data accessed more than 20 times per timing unit is hot data, data accessed less than 2 times per timing unit is cold data, and data accessed not more than 20 times and not less than 2 times per timing unit is warm data.

In the hierarchical and heterogeneous architecture, the classified data should be stored in a storage media with the matched storage characteristics. As shown, the data center 300 includes three groups of servers 302, 304, and 306. The servers communicate with each other via computer network. The server group 302 is responsible for the storage of hot data, which uses dynamic random access memory (DRAM), such as double data rate synchronous dynamic random access memory (DDR SDRAM), as the storage media. Although DRAM only has limited storage capacity, its access rate is high and suitable to hot data. The server group 304 is responsible for the storage of warm data, which uses SSD operated in the forgoing specific mode (e.g., the full-disk pseudo-SLC mode). The medium access rate and the medium storage capacity of the full-disk pseudo-SLC mode SSD is suitable for the storage need of warm data. The server group 306 is responsible for the storage of cold data, which uses the general SSD, hard disk, optical disc, or tape as the storage media. In spite of the low access rated, those high capacity storage devices are suitable to store cold data. In an exemplary embodiment, data issued by the host may be stored in the general SSDs of the servers 306 in a pseudo-SLC manner, and then collected in a multiple-level cell manner by garbage collection.

In terms of access rate, the DDR SDRAM adopted in the servers 302 is the fastest, the full-disk pseudo-SLC mode SSD adopted in the servers 304 is slower than DDR SDRAM, and the storage media adopted in the servers 306 is the slowest.

In terms of storage capacity, the DDR SDRAM adopted in the servers 302 is the smallest, the full-disk pseudo-SLC mode SSD adopted in the servers 304 is greater than DDR SDRAM, and the storage media adopted in the servers 306 is the largest.

The data stored in the servers 304 may be those moved from the servers 302 or 304, or may be those output from a central processing unit of the data center 300. When determining that the received uploaded data is warm data, the central processing unit of the data center 300 may directly program the warm data into the servers 304. In the servers 304, as any data has changed access frequency, the SSD controller 201 may modify the data mark from warm to hot, or from warm to cold. Accordingly, the servers 304 transfer the hot marked data to the servers 302, or transfer the cold marked data to the servers 306. In some situations, the central processing unit of the data center 300 may operate the servers 304 to transfer data to the servers 302 to modify warm data to hot data, or operate the servers 304 to transfer data to the servers 306 to modify warm data to cold data.

The full-disk pseudo-SLC mode SSD of the present invention reduces the cost of a hierarchical and heterogeneous data center 300, and perfectly achieve the purpose of hierarchical and heterogeneous storage. In some exemplary embodiments, the full-disk pseudo-SLC mode SSD may be provided by just a small amount of firmware modification of a general SSD, which requires only low installation cost, and is more attractive than data storage devices using a totally different type of storage media.

In an exemplary embodiment, the servers 304 are responsible for the usage of cloud logbooks. The high access rate and the plentiful storage space of full-disk pseudo-SLC mode SSD of the present invention can easily cope with the high-frequency access behavior and the considerable storage capacity need of the cloud logbooks. When finishing the update of a logbook, the servers 304 may transfer the logbook to the servers 306 to backup of the logbook. In this manner, the storage space of the servers 304 is not occupied by the finished logbook, which keeps with the design spirit of hierarchical and heterogeneous storage.

The foregoing embodiments take a TLC SSD as an example. In the other exemplary embodiments, the storage media in the server 304 may be any SSD with multi-level cells (e.g., MLCs, QLCs, and so on) whose full disk is operated in a pseudo-SLC manner.

The data center 300 in the figure has three groups of servers 302, 304, and 306, but it is not intended to limit the number of server groups. In the other exemplary embodiments, there may be more hierarchical storage levels for the heterogeneous data. Except the hottest data servers (302) and coldest data servers (306), a technique having a server group using the full-disk pseudo-SLC SSDs of the present invention should be regarded as within the scope of the present invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hierarchical and heterogeneous data center, comprising:
    a first group of servers, configured to provide a first type of storage media for storage of a first kind of data;
    a second group of servers, configured to provide a second type of storage media for storage of a second kind of data; and
    a third group of servers, configured to provide a third type of storage media for storage of a third kind of data;
    wherein:
    the first group of servers, the second group of servers, and the third group of servers are connected to each other via a computer network;
    an access frequency of the first kind of data is greater than an access frequency of the second kind of data;
    an access frequency of the second kind of data is greater than an access frequency of the third kind of data;
    the second type of storage media is a solid-state drive operated in a full-disk pseudo-single-level-cell mode; and
    in the second type of storage media, data collected by garbage collection is collected in a pseudo-single-level-cell manner.

2. The hierarchical and heterogeneous data center as claimed in claim 1, wherein:
    when recognized as the second kind of data, data that a user uploads to the hierarchical and heterogeneous data center is stored in the second type of storage media by the second group of servers in the pseudo-single-level-cell manner.

3. The hierarchical and heterogeneous data center as claimed in claim 2, wherein:
    data that the first group of servers reads from the first type of storage media and transfers to the second group of servers via the computer network is stored in the second type of storage media in the pseudo-single-level-cell manner.

4. The hierarchical and heterogeneous data center as claimed in claim 3, wherein:
    data that the third group of servers reads from the third type of storage media and transfers to the second group of servers via the computer network is stored in the second type of storage media in the pseudo-single-level-cell manner.

5. The hierarchical and heterogeneous data center as claimed in claim 1, wherein:
    the third type of storage media is a solid-state drive of the same type as the solid-state drive implementing the second type of storage media; and
    the solid-state drive implementing the third type of storage media is operated in a multi-level cell mode.

6. The hierarchical and heterogeneous data center as claimed in claim 5, wherein:

in the third type of storage media, data is first programmed in a pseudo-single-level-cell manner and then, by garbage collection, collected in a multi-level cell mode.

7. The hierarchical and heterogeneous data center as claimed in claim 6, wherein:
the first type of storage media provides volatile storage.

8. The hierarchical and heterogeneous data center as claimed in claim 7, wherein:
the first type of storage media is double data rate synchronous dynamic random access memory.

9. The hierarchical and heterogeneous data center as claimed in claim 1, wherein:
an access rate of the first type of storage media is greater than an access rate of the second type of storage media; and
the access rate of the second type of storage media is greater than an access rate of the third storage media.

10. The hierarchical and heterogeneous data center as claimed in claim 1, wherein:
a storage capacity of the first type of storage media is smaller than a storage capacity of the second storage media; and
the storage capacity of the second type of storage media is smaller than a storage capacity of the third storage media.

11. The hierarchical and heterogeneous data center as claimed in claim 1, wherein:
the second group of servers provides the second type of storage media for browsing cloud logbooks.

* * * * *